Nov. 29, 1955  C. D. McCLURE  2,725,527
SYSTEM FOR MEASURING AMPLIFIER PHASE SHIFT
Filed Jan. 23, 1950
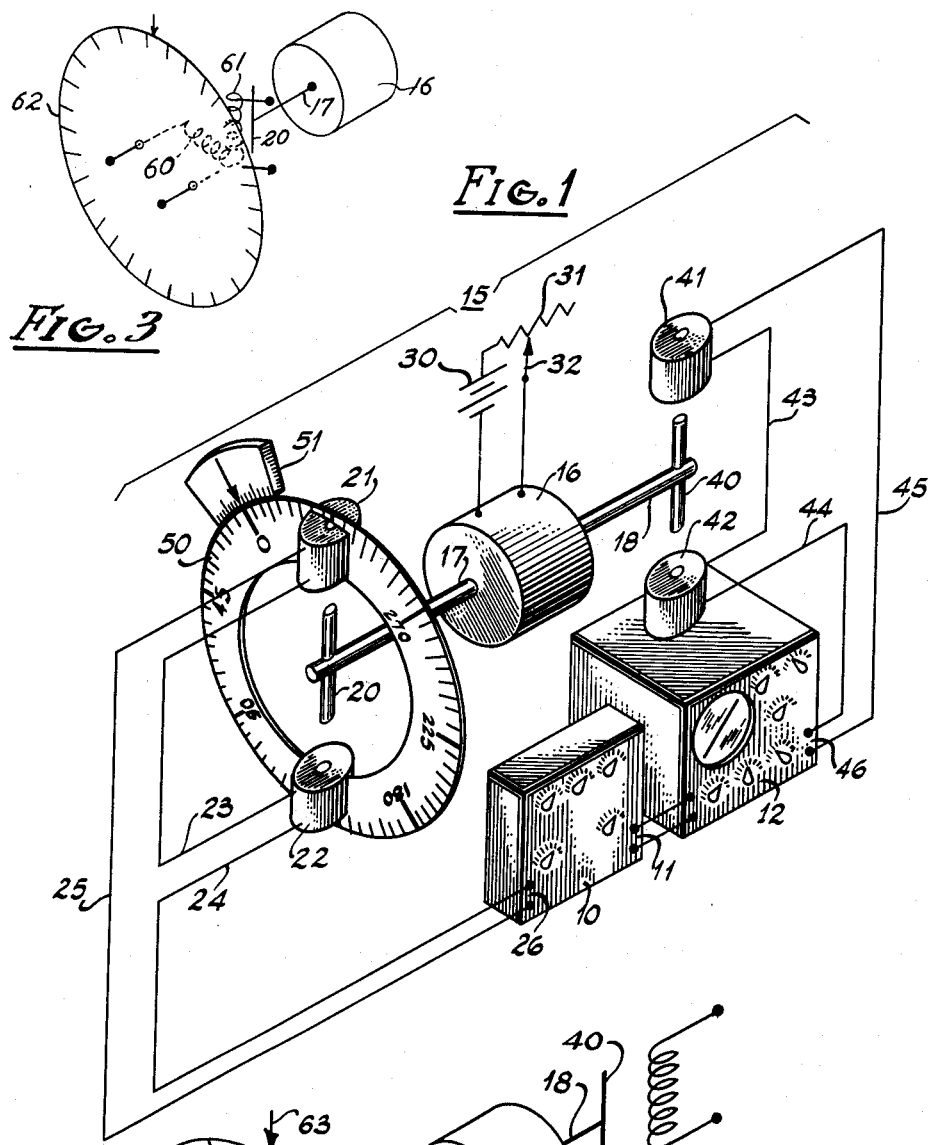
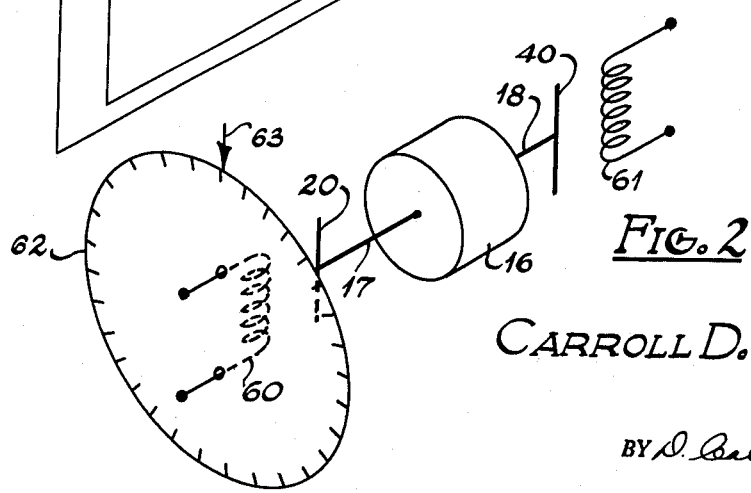
CARROLL D. McCLURE
INVENTOR.
BY D. Carl Richards
AGENT

United States Patent Office 2,725,527
Patented Nov. 29, 1955

2,725,527

SYSTEM FOR MEASURING AMPLIFIER PHASE SHIFT

Carroll D. McClure, Dallas, Tex., assignor, by mesne assignments, to Socony Mobil Oil Company, Inc., a corporation of New York Application January 23, 1950, Serial No. 140,131

4 Claims. (Cl. 324—57)

This invention relates to the simultaneous generation of a plurality of signals and more particularly to a system for generating two signals of selectively adjustable and readily measurable phase for measurement of phase delays encountered in amplifiers having sharply varying amplitude-frequency characteristics.

The system of the present invention is useful for evaluation of phase shift characteristics of seismic amplifiers and particularly in the production testing of the several amplifier channels to be used in a common bank and so interrelated in their operation that they must have uniform or identical phase shift characteristics. Seismic signals are recorded in side by side relation on an elongated photographic chart. Sharply tuned filter circuits in the associated amplifier channels eliminate unwanted signals but as a general rule introduce considerable phase delays which are not uniform throughout the pass band as defined or indicated on the amplitude-frequency characteristics. It would be desirable to have an amplifier phase shift characteristic which is a straight line. This is seldom accomplished if narrow band widths are employed, but in any case, it is necessary that there be uniform phase shifts among all of the channels in a common bank in order that the signals recorded on the photographic chart may be relied upon as being accurately spaced in time as between themselves so that data taken therefrom may be relied upon as indicating depths accurately.

It has been proposed to measure such phase shifts at a plurality of frequencies in the region of the pass band of the amplifier by recording the amplifier input signal and output signal on adjacent traces on a photographic chart. However, it has been found that the definition in such procedure is inherently so low that it is impossible to obtain an accurate evaluation of phase shift for a reliable comparison of the operation of associated amplifiers. This will be evident when it is remembered that phase shifts are measured down to one or two degrees. On a seismic record or chart, time intervals of approximately .001 second can be measured A 50 cycle per second wave has a period of .020 seconds which means that a phase change of 18° is the smallest that can be detected.

For the direct and accurate measurement of phase delays such as encountered in seismic amplifiers, there is provided in accordance with the present invention two signal generators each comprising a magnetic element and a coil with a common drive means for producing relative rotational movement between the coils and their associated magnetic elements for generating two signals of identical frequency. Means are provided for adjusting the rotational position of maximum electromagnetic coupling between one of the coils and its associated magnetic element to vary the phase angle between the two signals, and means further is provided for measuring the amount of rotational adjustment whereby the phase relationship between the signals may be determined.

For a more complete understanding of the present invention and for further objects and advantages thereof, reference may now be had to the following description taken in conjunction with the accompanying drawing in which:

Fig. 1 is a schematic diagram of the phase-measuring system which includes the signal generator;

Fig. 2 illustrates a modification of the generator of Fig. 1; and

Fig. 3 illustrates a further modification of the invention.

Referring now to Fig. 1, amplifier 10 whose phase shift is to be measured has been illustrated with its output circuit 11 connected to the input of an oscilloscope 12. In accordance with the present invention, a dual signal generator 15 is provided for generation of a test signal and a reference signal whose functions are described hereinafter. The generator is illustrated as comprising a motor 16, having shafts 17 and 18 extending from either end thereof. Shaft 17 carries at one extremity a bar magnet 20 which rotates in a plane normal to the axis of the shaft of motor 16 upon energization thereof. Two coils 21 and 22 are positioned in the plane of rotation of the magnet 20 and are centered on a line which passes through the axis of the shaft 17. The coils 21 and 22, which may have either air or magnetic cores, form a portion of the magnetic circuit and link the flux emanating from the bar magnet 20. The coils 21 and 22 are connected in series circuit by conductors 23, 24 and 25 to the input terminals 26 of the amplifier 10. The series circuit is so arranged that the voltages generated in coils 21 and 22 upon rotation of magnet 20 are additive in polarity. The coils 21 and 22 are spaced a sufficient distance from the ends of the magnet 20 for operation in the fringing flux so that upon rotation of magnet 20 the variation in flux linking the coils is essentially a sinusoidal function.

The variable drive for shafts 17 and 18 has been shown as comprising the motor 16, which may be of any type in which the speed and thus the frequency of the output voltage is variable. As illustrated, the battery 30 and potentiometer 31 in the exciting circuit to the motor 16 provides such a variable speed control. Variation of the position of the tap 32 on potentiometer 31 varies the frequency of the signal applied to amplifier 10, the range of variation depending on the speed range of the motor. A synchronous motor and a Reeves or other variable drive may also be utilized for control of the speed of shafts 17 and 18.

For seismic amplifiers, the required frequency range may extend from 10 or 15 cycles per second to as high as 150 cycles per second. Thus, the signal generated in coils 21 and 22 is applied to the input of amplifier 10, and the output therefrom applied to the oscilloscope input and ultimately provides a deflecting voltage for the cathode ray or oscilloscope spot. For the purpose of the present description, it will be assumed that the amplifier 10 supplies the vertical deflecting voltage for the oscilloscope 12.

A second signal source is associated with the motor 16 to provide a second voltage having a readily measurable phase relation with respect to the voltage from coils 21 and 22. More particularly, a bar magnet 40 is carried by the extremity of shaft 18 in operative relation to a second pair of coils 41 and 42. For the purpose of the present description, it will be assumed that bar magnet 40 is oriented in precisely the same plane as the bar magnet 20. The two coils 41 and 42 are connected in series circuit by conductors 43, 44 and 45 and to the second input 46 of the oscilloscope 12. The voltage developed from input 46 controls the horizontal deflecting plates of the oscilloscope. The coils 41 and 42 are suitably supported fixed in relation to the shaft 18 of the motor 16 and, in the modification of Fig. 1, are in the plane of rotation of the magnet 40.

If coils 21, 22, 41 and 42 are oriented with their axes in a common plane which is normal to the planes of rotation of magnets 20 and 40, and if magnets 20 and 40 are in a common plane, the voltages generated upon rotation of magnets 20 and 40 applied to the input of amplifier 10 and to the horizontal deflecting plates of the oscilloscope 12 will be exactly in phase. If there is no phase shift in amplifier 10, the signal applied to the vertical deflecting plates (output of amplifier 10) will be precisely in phase with the voltage applied to the horizontal plates, and the oscilloscope trace will assume a straight line or a closed figure which is a well recognized phase-indicating pattern as is understood by those skilled in the art. If the signal from coils 21 and 22 experiences a phase shift in transit through amplifier 10, there will be a phase difference in the signals applied to the deflecting plates of the oscilloscope, and an ellipse or circle (as distinguished from the above mentioned straight line) will appear on the oscilloscope. The figure on the oscilloscope provides for an accurate indication of when there is phase coincidence as between the two deflecting voltages, and any difference in phase between those voltages as caused by a phase delay in the amplifier 10 will be readily apparent.

In accordance with the present invention, one of the two pairs of coils is made adjustable in the plane of rotation of its associated magnet relative to the other pair of coils so that the relative phase between the signals may be varied. More particularly and as illustrated in Fig. 1, the coils 21 and 22 are carried by a calibrated annulus or disc-like mounting 50. The disc 50 in the modification illustrated has its periphery calibrated in terms of degrees and has associated therewith, an index 51. By rotating the mounting 50 relative to its support (not shown), either clockwise or counter-clockwise as may be required to produce a straight line on the oscilloscope 12, a direct measurement of amplifier phase shift is available at the particular frequency of operation. Thus, the amplifier phase shift or phase delay at any selected frequency may be read directly from the scale marked on the edge of the mounting 50. This system, which is essentially a null measuring system affords high precision and has been found to give measurements of an accuracy of better than one degree which is well within the required limits for measurements of the seismic amplifier.

A modification of the invention has been illustrated in Fig. 2 where like parts have been given the same reference characters as in Fig. 1. Coils 60 and 61 are positioned adjacent magnets 20 and 40 and are spaced therefrom axially of motor 16. The distance between each coil and its associated magnet is selected so that the coil operates in the fringing flux and that magnetic cores, when used in the coils 60 and 61, will not appreciably alter the magnetic field. The voltage generated will then be of sine wave character. The disc 62 serves as a mounting for coil 60, and has its periphery calibrated for measurement of the relative angular positions of coil 60 with respect to the fixed coil 61. An index, generically illustrated by arrow 63 may be used as a reference for measurement of the phase angle between the two generated voltages.

It will now be apparent that the coils 60 and 61 may both be linked to the same magnet as shown in Fig. 3. More particularly, the coil 61 may be placed between coil 60, the end of shaft 17 carrying magnet 20. Coil 61 would be fixed and coil 60 movable just as in Fig. 2. This system would require but a single magnet and would produce sine wave voltages differing in amplitude by a fixed amount, depending on the relative distances between magnet 20 and the coils, and differing in phase equal to the angle between the coil axes.

Further, the phase adjustment means could be a calibrated differential gear placed in either shaft 17 or 18 between the motor and its associated magnet rather than the rotationally adjustable disc for coils 21 and 22 or 60 and 61. With such a construction, the relative angular position between mangets 20 and 40 would be varied as a direct measurement of the amplifier phase shift. A speed indicator for shafts 17 and 18 is also desirable for direct measurement of the test frequency of the generated voltages. While, for the purpose of the present description, magnets 20 and 40 have been utilized, it will be apparent that the cores of the coils 21, 22, 41 and 42 could be permanent magnets, and low reluctance bars could be carried by the shafts 17 and 18 in place of magnets 20 and 40. Rotation of such bars would vary the reluctance of the magnetic circuit which would result in generation of voltages in the coils. Alternatively, each pair of coils could be provided with a separate circuit including a source of direct current to polarize them, and thus the system would not require any permanent magnets.

While preferred embodiments of the invention have been described, it is to be understood that further modifications may be made without departing from the spirit and scope of the invention as set forth in the appended claims.

What is claimed is:

1. In an amplifier phase calibrating system which includes an oscilloscope having one beam deflecting input excited by the output of the amplifier, the improvement which comprises a pair of sine wave generators which includes two magnetic elements, means for synhcronously rotating said elements, two coils, one disposed adjacent each of said elements and linking flux associated with the adjacent element for generation of two sine wave voltages of frequency proportional to the speed of rotation of said elements, circuit means connecting one of said coils in the input circuit of said amplifier and the other coil in the second beam deflecting input circuit of said oscilloscope for producing a pattern on said oscilloscope dependent upon the phase of the signals applied thereto, means for separating the instants of maximum coupling between said coils and said flux to vary the phase angle between said voltages for producing on said oscilloscope a pattern of predetermined phase indicating character, and means for measuring said separation for direct measurement of the phase shift of said amplifier as indicated by said pattern.

2. In an amplifier phase calibrating system which includes an oscilloscope having one beam deflecting input excited by the output of the amplifier, the improvement which comprises a pair of sine wave generators which includes two magnetic elements, means for synchronously rotating said elements, a coil disposed adjacent each of said elements, each coil linking flux associated with its adjacent element for generation of two sine wave voltages of frequency proportional to the speed of rotation of said elements, circuit means connecting said coils respectively in the input circut of said amplifier and to the second beam deflecting input circuit of said oscilloscope for producing a pattern on said oscilloscope dependent upon the phase of the signals applied thereto, means for separating the positions of maximum coupling between said coils and said flux to vary the phase angle between said voltages for producing on said oscilloscope a pattern of predetermined phase indicating character, and means for measuring the separation of said position for direct measurement of the phase shift of said amplifier as indicated by said pattern.

3. In an amplifier phase calibrating system which include an oscilloscope having one beam deflecting input excited by the output of said amplifier, the improvement which comprises an elongated permanent magnet, speed adjustable means for rotating said magnet about an axis perpendicularly bisecting the longitudinal axis thereof, a coil adjacent said magnet and rotatably positioned and mounted for rotation of the axis thereof in a plane parallel to the plane of rotation of said magnet and a fixed coil positioned adjacent said magnet with its axis in a plane parallel to the plane of rotation of said magnet for generation of two sine wave voltages of frequency proportional to the speed of rotation of said permanent magnet, circuit means connecting one of said coils in the input of said amplifier and the other coil in the second beam deflecting input circuit of said oscilloscope for producing a pattern thereon dependent upon the phase of the signals applied thereto, means for selectively adjusting the rotation of said first-named coil to vary the phase angle between said voltages for producing on said oscilloscope a pattern of predetermined phase indicating character, and means for measuring said separation as a direct measurement of the phase shift of said amplifier as indicated by said pattern.

4. In an amplifier phase calibrating system which includes an oscilloscope having one beam deflecting input excited by the output of the amplifier, the improvement which comprises a magnetic element, means for rotating said element, two coils disposed adjacent said element and linking flux associated therewith for generation of two sine wave voltages of frequency proportional to the speed of rotation, circuit means connecting one of said coils in the input circuit of said amplifier and the other coil in the second beam deflecting input circuit of said oscilloscope for producing a pattern thereon dependent upon the phase of the signals applied thereto, means for separating the instants of maximum coupling between said coils and said flux to vary the phase angle between said voltages for producing on said oscilloscope a pattern of predetermined phase indicating character, and means for measuring said separation for direct measurement of the phase shift of said amplifier as indicated by said pattern.

References Cited in the file of this patent

UNITED STATES PATENTS

| Number | Name | Date |
|---|---|---|
| 716,429 | Kelly | Dec. 23, 1902 |
| 1,881,011 | Wittkuhns | Oct. 4, 1932 |
| 2,082,030 | Schrader, et al. | June 1, 1937 |
| 2,193,079 | Schrader | Mar. 12, 1940 |
| 2,200,103 | Shutt | May 7, 1940 |
| 2,297,436 | Scholz | Sept. 29, 1942 |
| 2,305,125 | Wolferz | Dec. 15, 1942 |
| 2,432,500 | Alexandersson | Dec. 16, 1947 |
| 2,595,263 | Ingalls | May 6, 1952 |

OTHER REFERENCES

"Modulated-Beam Cathode-Ray Phase Meter," by Alan Watton, Jr. Proceedings of the I. R. E., vol. 32, No. 5, May 1944.